(12) United States Patent
Elfayoumy et al.

(10) Patent No.: US 7,676,485 B2
(45) Date of Patent: Mar. 9, 2010

(54) METHOD AND COMPUTER PROGRAM PRODUCT FOR CONVERTING ONTOLOGIES INTO CONCEPT SEMANTIC NETWORKS

(75) Inventors: Sherif A. Elfayoumy, Jacksonville, FL (US); Rengaswamy Mohan, Jacksonville, FL (US)

(73) Assignee: Ixreveal, Inc., Jacksonville, FL (US)

( * ) Notice: Subject to any disclaimer, the term of this patent is extended or adjusted under 35 U.S.C. 154(b) by 342 days.

(21) Appl. No.: 11/656,017

(22) Filed: Jan. 22, 2007

(65) Prior Publication Data

US 2007/0192272 A1  Aug. 16, 2007

Related U.S. Application Data

(60) Provisional application No. 60/760,392, filed on Jan. 20, 2006.

(51) Int. Cl.
 G06F 7/00 (2006.01)
 G06F 17/00 (2006.01)

(52) U.S. Cl. .................... 707/101; 707/103 X; 706/55

(58) Field of Classification Search .............. 707/1–10, 707/100–104.1, 200–206; 706/55
See application file for complete search history.

(56) References Cited

U.S. PATENT DOCUMENTS

| | | |
|---|---|---|
| 4,839,853 A | 6/1989 | Deerwester et al. |
| 5,278,980 A | 1/1994 | Pedersen et al. |
| 5,295,256 A | 3/1994 | Bapat |
| 5,418,951 A | 5/1995 | Damashek |
| 5,488,725 A | 1/1996 | Turtle et al. |
| 5,519,865 A | 5/1996 | Kondo et al. |
| 5,555,408 A | 9/1996 | Fujisawa |
| 5,592,667 A | 1/1997 | Bugajski |
| 5,617,578 A | 4/1997 | Kroll et al. |
| 5,619,709 A | 4/1997 | Caid et al. |
| 5,634,051 A | 5/1997 | Thomson |
| 5,727,950 A | 3/1998 | Cook et al. |
| 5,761,496 A | 6/1998 | Hattori |
| 5,768,578 A | 6/1998 | Kirk et al. |
| 5,794,178 A | 8/1998 | Caid et al. |
| 5,819,260 A | 10/1998 | Lu et al. |
| 5,832,182 A | 11/1998 | Zhang et al. |
| 5,832,470 A | 11/1998 | Morita et al. |
| 5,867,799 A | 2/1999 | Lang et al. |
| 5,884,305 A | 3/1999 | Kleinberg et al. |
| 5,905,498 A * | 5/1999 | Diament ..................... 715/853 |
| 5,920,864 A | 7/1999 | Zhao |
| 5,924,090 A | 7/1999 | Krellenstein |
| 5,926,811 A | 7/1999 | Miller et al. |
| 5,933,822 A | 8/1999 | Braden-Harder et al. |
| 5,983,214 A | 11/1999 | Lang et al. |
| 5,987,446 A | 11/1999 | Corey et al. |

(Continued)

OTHER PUBLICATIONS

Fishwick et al., Ontologies for modeling and simulation: issues and approaches, Dec. 5-8, 2004, IEEE, vol. 1, 6 pages.*

(Continued)

*Primary Examiner*—Jean B. Fleurantin

(57) ABSTRACT

A method and computer program product for producing a concept semantic network (CSN) from an ontology. Each class, subclass, object, restriction, and property of the ontology is converted into a concept of the CSN. Each hierarchy in the ontology is converted to a concept hierarchy of the CSN.

4 Claims, 7 Drawing Sheets

U.S. PATENT DOCUMENTS

| | | | |
|---|---|---|---|
| 5,987,447 | A | 11/1999 | Chang et al. |
| 6,006,221 | A | 12/1999 | Liddy et al. |
| 6,026,388 | A | 2/2000 | Liddy et al. |
| 6,028,605 | A | 2/2000 | Conrad et al. |
| 6,029,161 | A | 2/2000 | Lang et al. |
| 6,038,561 | A | 3/2000 | Snyder et al. |
| 6,055,526 | A | 4/2000 | Ambroziak |
| 6,078,924 | A | 6/2000 | Ainsbury et al. |
| 6,101,491 | A | 8/2000 | Woods |
| 6,101,492 | A | 8/2000 | Jacquemin et al. |
| 6,101,515 | A | 8/2000 | Wical et al. |
| 6,122,628 | A | 9/2000 | Castelli et al. |
| 6,182,063 | B1 | 1/2001 | Woods |
| 6,189,002 | B1 | 2/2001 | Roitblat |
| 6,195,657 | B1 | 2/2001 | Rucker et al. |
| 6,199,034 | B1 | 3/2001 | Wical |
| 6,199,067 | B1 | 3/2001 | Geller |
| 6,233,575 | B1 | 5/2001 | Agrawal et al. |
| 6,236,987 | B1 | 5/2001 | Horowitz et al. |
| 6,256,633 | B1 | 7/2001 | Dharap |
| 6,263,335 | B1 | 7/2001 | Paik et al. |
| 6,289,382 | B1 | 9/2001 | Bowman-Amuah |
| 6,300,957 | B1 | 10/2001 | Rao et al. |
| 6,308,175 | B1 | 10/2001 | Lang et al. |
| 6,314,420 | B1 | 11/2001 | Lang et al. |
| 6,327,593 | B1 | 12/2001 | Goiffon |
| 6,330,563 | B1 | 12/2001 | Heckerman |
| 6,366,908 | B1 | 4/2002 | Chong et al. |
| 6,377,259 | B1 | 4/2002 | Tenev et al. |
| 6,385,600 | B1 | 5/2002 | McGuinness et al. |
| 6,385,602 | B1 | 5/2002 | Tso et al. |
| 6,424,973 | B1 | 7/2002 | Baclawski |
| 6,442,545 | B1 | 8/2002 | Feldman et al. |
| 6,453,312 | B1 | 9/2002 | Goiffon et al. |
| 6,453,339 | B1 | 9/2002 | Schultz et al. |
| 6,477,524 | B1 | 11/2002 | Taskiran et al. |
| 6,492,989 | B1 | 12/2002 | Wilkinson |
| 6,496,818 | B1 | 12/2002 | Ponte |
| 6,510,406 | B1 | 1/2003 | Marchisio |
| 6,513,036 | B2 | 1/2003 | Fruensgaard et al. |
| 6,523,028 | B1 | 2/2003 | DiDomizio et al. |
| 6,532,469 | B1 | 3/2003 | Feldman et al. |
| 6,539,376 | B1 | 3/2003 | Sundaresan et al. |
| 6,564,210 | B1 | 5/2003 | Korda et al. |
| 6,567,797 | B1 | 5/2003 | Schuetze et al. |
| 6,567,804 | B1 | 5/2003 | Ramasamy et al. |
| 6,581,068 | B1 | 6/2003 | Bensoussan et al. |
| 6,606,659 | B1 | 8/2003 | Hegli et al. |
| 6,611,825 | B1 | 8/2003 | Billheimer et al. |
| 6,628,312 | B1 | 9/2003 | Rao et al. |
| 6,629,095 | B1 | 9/2003 | Wagstaff et al. |
| 6,629,097 | B1 | 9/2003 | Keith |
| 6,633,868 | B1 | 10/2003 | Min et al. |
| 6,636,848 | B1 | 10/2003 | Aridor et al. |
| 6,643,661 | B2 | 11/2003 | Polizzi et al. |
| 6,654,761 | B2 | 11/2003 | Tenev et al. |
| 6,675,159 | B1 | 1/2004 | Lin et al. |
| 6,684,207 | B1 | 1/2004 | Greenfield et al. |
| 6,701,305 | B1 | 3/2004 | Holt et al. |
| 6,728,707 | B1 | 4/2004 | Wakefield et al. |
| 6,732,097 | B1 | 5/2004 | Wakefield et al. |
| 6,732,098 | B1 | 5/2004 | Wakefield et al. |
| 6,738,765 | B1 | 5/2004 | Wakefield et al. |
| 6,741,988 | B1 | 5/2004 | Wakefield et al. |
| 6,766,316 | B2 | 7/2004 | Caudill et al. |
| 6,778,979 | B2 | 8/2004 | Grefenstette et al. |
| 6,892,189 | B2 | 5/2005 | Quass et al. |
| 6,895,406 | B2 | 5/2005 | Fables et al. |
| 6,901,555 | B2 | 5/2005 | Hida et al. |
| 6,928,398 | B1 | 8/2005 | Fang et al. |
| 6,941,321 | B2 | 9/2005 | Schuetze et al. |
| 6,944,626 | B2 | 9/2005 | Cameron et al. |
| 6,961,731 | B2 | 11/2005 | Holbrook |
| 6,970,860 | B1 | 11/2005 | Liu et al. |
| 6,970,881 | B1 | 11/2005 | Mohan et al. |
| 6,976,017 | B1 | 12/2005 | Getchius |
| 7,023,453 | B2 | 4/2006 | Wilkinson et al. |
| 7,194,483 | B1 | 3/2007 | Mohan et al. |
| 2002/0007373 | A1 | 1/2002 | Blair et al. |
| 2002/0016800 | A1 | 2/2002 | Spivak et al. |
| 2002/0069203 | A1 | 6/2002 | Dar et al. |
| 2002/0091696 | A1 | 7/2002 | Craft et al. |
| 2002/0107844 | A1 | 8/2002 | Cha et al. |
| 2002/0120609 | A1 | 8/2002 | Lang et al. |
| 2002/0129015 | A1 | 9/2002 | Caudill et al. |
| 2003/0014403 | A1 | 1/2003 | Chandrasekar et al. |
| 2003/0018659 | A1 | 1/2003 | Fuks et al. |
| 2003/0069882 | A1 | 4/2003 | Nieswand et al. |
| 2003/0149586 | A1 | 8/2003 | Chen et al. |
| 2003/0163454 | A1 | 8/2003 | Jacobsen et al. |
| 2003/0187632 | A1 | 10/2003 | Menich |
| 2004/0002959 | A1 | 1/2004 | Alpert et al. |
| 2004/0019588 | A1 | 1/2004 | Doganata et al. |
| 2004/0049478 | A1 | 3/2004 | Jasper et al. |
| 2004/0083206 | A1 | 4/2004 | Wu et al. |
| 2004/0167870 | A1 | 8/2004 | Wakefield et al. |
| 2004/0167883 | A1 | 8/2004 | Wakefield et al. |
| 2004/0167884 | A1 | 8/2004 | Wakefield et al. |
| 2004/0167885 | A1 | 8/2004 | Wakefield et al. |
| 2004/0167886 | A1 | 8/2004 | Wakefield et al. |
| 2004/0167887 | A1 | 8/2004 | Wakefield et al. |
| 2004/0167907 | A1 | 8/2004 | Wakefield et al. |
| 2004/0167908 | A1 | 8/2004 | Wakefield et al. |
| 2004/0167909 | A1 | 8/2004 | Wakefield et al. |
| 2004/0167910 | A1 | 8/2004 | Wakefield et al. |
| 2004/0167911 | A1 | 8/2004 | Wakefield et al. |
| 2004/0199498 | A1 | 10/2004 | Kapur et al. |
| 2004/0254916 | A1 | 12/2004 | Dettinger et al. |
| 2005/0021290 | A1 | 1/2005 | Velipasaoglu |
| 2005/0021357 | A1 | 1/2005 | Schuetze et al. |
| 2005/0021512 | A1 | 1/2005 | Koenig |
| 2005/0060340 | A1 | 3/2005 | Sommerfield |
| 2005/0065957 | A1 | 3/2005 | Schuetze et al. |
| 2005/0091197 | A1 | 4/2005 | Dettinger |
| 2005/0091198 | A1 | 4/2005 | Dettinger |
| 2005/0108256 | A1 | 5/2005 | Wakefield et al. |
| 2005/0149496 | A1 | 7/2005 | Mukherjee et al. |
| 2005/0154711 | A1 | 7/2005 | McConnell |
| 2005/0160080 | A1 | 7/2005 | Dawson |
| 2005/0160082 | A1 | 7/2005 | Dawson |
| 2005/0192926 | A1* | 9/2005 | Liu et al. ............... 707/1 |
| 2005/0193055 | A1 | 9/2005 | Angel et al. |
| 2005/0234879 | A1 | 10/2005 | Zeng et al. |
| 2005/0246320 | A1 | 11/2005 | Benysh et al. |
| 2005/0278323 | A1 | 12/2005 | Horvitz et al. |
| 2006/0047649 | A1 | 3/2006 | Liang |
| 2006/0106793 | A1 | 5/2006 | Liang |
| 2007/0033221 | A1 | 2/2007 | Copperman et al. |

OTHER PUBLICATIONS

Cross, Fuzzy semantic distance measures between ontological concepts, Jun. 27-30, 2004, IEEE, vol. 2, 635-640.*

Ankerst, et al., "DataJewel: Tightly Integrating Visualization with Temporal Data Mining" ICDM Workshop on Visual Data Mining, Melbourne, FL, Nov. 19-23, 2003.

Arents, H.C. et al., "Concept-Based Retrieval of Hypermedia Information: From Term Indexing to Semantic Hyperindexing," Information Processing & Management vol. 29, No. 3, pp. 373-386, May-Jun. 1993.

Belew, Richard, "A connectionist approach to conceptual Information Retrieval," ICAIL, May 27-29, 1987.

Bhatia et al., Conceptual Clustering In Information Retrieval, Systems, Man, and Cybernetics, Part B, IEEE Transactions, v. 28, issue 3, pp. 427-436, Jun. 1998.

Boeing Frontiers, "Text mining for golden results," p. 50, Jul. 2005.

Botev et al. "Context-sensitive keyword search and ranking for XML" Eighth International Workshop on the Web and Databases, Jun. 16-17, 2005.

Crouch, C. et al., Experiments in automatic statistical thesaurus construction, Proceedings of the Fifteenth Annual International ACM SIGIR Conference on Research and development in Information Retrieval, pp. 77-88, Jun. 21-24, 1992.

Deerwester et al., "Indexing by latent semantic analysis," Journal of the Society for Information Science, vol. 41, num. 6, 391-407, Sep. 1990.

Dumais et al., "Inductive Learning Algorithms and Representations for Text Categorization", Proceedings of the seventh international conference on information and knowledge management, pp. 148-155, ACM Press, 1998.

Dumais et al "optimizing search by showing results in context" SIGHCHL'01 Mar. 31-Apr. 5, 2001.

Fagan, J., "Automatic phrase indexing for document retrieval," Proceedings of the Tenth Annual International aCM SIGIR Conference on Research and Development in Information Retrieval, pp. 91-101, Jun. 3-5, 1987.

Feldman, "Tutorial 4, Mining Unstructured Data", KDD Tutorial Notes, pp. 182-236, 1999.

Finkelstein et al., "Placing search in context: The concept revisited," Tenth International Conference on World Wide Web, pp. 406-414, May 1-5, 2001.

Giger, H.P., Concept Based Retrieval in Classical IR Systems, Proceedings of the Eleventh Annual International SCM SIGIR Conference on Research and Development in Information Retrieval, pp. 275-289, May 1998.

Haveliwala, Topic-sensitive pagerank: A context-sensitive ranking algorithm for web search, Eleventh International Conference on world Wide Web, May 7-11, 2002.

Jain et al., Data Clustering: A Review, ACM Computing Surveys, vol. 31, num. 3, Sep. 1999.

Jang, Ho Wook and Se Young Park, "Keyfact Concept for an Information Retrieval System," Proceedings of Natural Language Processing Pacific Rim Symposium, pp. 510-513, Dec. 4-7, 1995.

Jun, M.S. & Park, S.Y. "Keyfact-Based Information Retrieval System", International Symposium on Digital Library, pp. 521-524 (1997).

Kolda et al., A Semidiscrete Matrix Decomposition for Latent Semantic Indexing in Information Retrieval, ACM Transactions on Information Systems (TOIS), vol. 16, Issue 4, pp. 322-346, Oct. 1998.

Kritzestein, B., "Starlight: Knowledge Management on a Whole New Plane," Chemical and Biological Defense Infor analysis center Newsletter, vol. 5, num. 4, pp. 10-12, Fall 2004.

Lawrence, S., "Context in Web search," Data Engineering, IEEE Computer Society, vol. 23, No. 3, pp. 25-32, Sep. 2000.

Leake et al., "Exploiting rich context: An incremental approach to context-based web search," Proceedings of Fifth International and Interdisciplinary Conference on Modeling and Using Context, Paris, France, vol. 3554, pp. 254-267, Jul. 5-8, 2005.

Leake et al., "Towards context-based search engine selection," Sixth International Conference on Intelligent User Interfaces, Santa Fe, New Mexico, pp. 109-112, Jan. 14-17, 2001.

Nigam et al., "Learning to classify Text From Labeled and Unlabeled Documents", Proceedings of AAAI-98, 15th Conference of the American Association for artificial Intelligence, 1998.

Salton, G. et al., "A Vector Space Model for Automatic Indexing," Communications of the ACM, vol. 18, No. 11, pp. 613-620, Nov. 1975.

Singh et al., Generating association Rules From Semi-Structured Documents Using an Extended Concept Hierarchy, Proceedings of the sixth international conference on information and knowledge Management, pp. 193-200, Nov. 10-14, 1997.

Yang, "an Evaluation of Statistical approaches to Text Categorization", Information Retrieval, vol. 1, issue 1-2, pp. 69-90, 1999.

European Search Report issued in EP Application No. 06816600.8, Jun. 15, 2009, 6 pgs.

\* cited by examiner

METHOD AND COMPUTER PROGRAM PRODUCT FOR CONVERTING ONTOLOGIES INTO CONCEPT SEMANTIC NETWORKS

This non-provisional patent application claims the benefit of U.S. Provisional Application 60/760,392 filed Jan. 20, 2006.

BACKGROUND OF THE INVENTION

1. Field of the Invention

The invention described herein relates to analysis of unstructured information and, in particular, relates to text analytics.

2. Related Art

More than 80% of data being gathered by users of information systems is unstructured. This data may be in the form of emails, blogs, websites, documents, spreadsheets etc. As the number of computer and Internet users continues to grow, more and more unstructured data content is created. This is evident when observing the growth of the Internet and websites (about 10 million) and documents and emails residing on an individual's desktop. This growth of data has created a need for understanding and leveraging the data's content.

This has given rise to the emerging text analytics area. This area focuses on understanding, harnessing and linking contents of emails, websites, and text data, for example, in database records and documents (henceforth collectively called "documents"). The primary domain of expertise and knowledge comes from natural language processing (NLP), a subdivision of artificial intelligence (AI).

The advantages of text analytics are well-known and several text analysis techniques are increasingly adopted in all walks of life. Today, customer feedback through a company's website is analyzed immediately and accurately for negative tones. Once such tones are identified, they are immediately used with the rest of the customer data for personalized action. Law enforcement agencies use the text analysis techniques on incident reports to look for the modus operandi of suspected criminals. Such broad examples are plentiful. In spite of such compelling benefits and advantages, however, text analysis adoption has been limited due to several limitations in current processing techniques.

There are several methods/algorithms available in NLP that can be used in attempting to understand the language of a document and summarize what the document is about. The challenge has been to match the expectations of the reviewer with the output of the NLP algorithm(s).

Overcoming this challenge has been difficult and several approaches have been proposed with varied degrees of success. Key approaches in this area include:

Use of clustering techniques to identify key themes and patterns: These techniques are very useful in identifying themes of interest and then identifying nuggets of information around these themes. Usually, these techniques make assumptions about themes of interest and build clustered word patterns around those assumptions. As the entire process is automated, many times these techniques produce output that might not fit the user's interest. As a result, clustering is of limited value to situations where the user's interest is not centered on themes of interest.

Idea extraction techniques to summarize contents based on ideas: These techniques are based on the notion that the purpose of natural language is to communicate ideas and therefore, capturing ideas (for example, from a document) is tantamount to capturing the essence of communication. While these techniques have applications in several business and consumer areas, they cannot be easily adapted to identify conditions that do not form the main idea or theme but yet might be of interest to the user.

Semantic networks based on semantic indexing: Semantic networks are based on the notion of extracting semantic content from a document by combining like terms with the help of thesaurus, dictionary or other similar look-up tools. While these networks can accurately reflect contents, they tend to produce high volume of results for even small document sets and thus are not scalable.

Semantic and syntax analysis: These techniques take into account grammatical constructs within the natural language to pick up themes and patterns, to build a summarization. However, these techniques are computationally intensive and are not scalable.

What is needed, therefore, is a method and system for performing text analytics in a manner that avoids these shortcomings.

Figure 1:
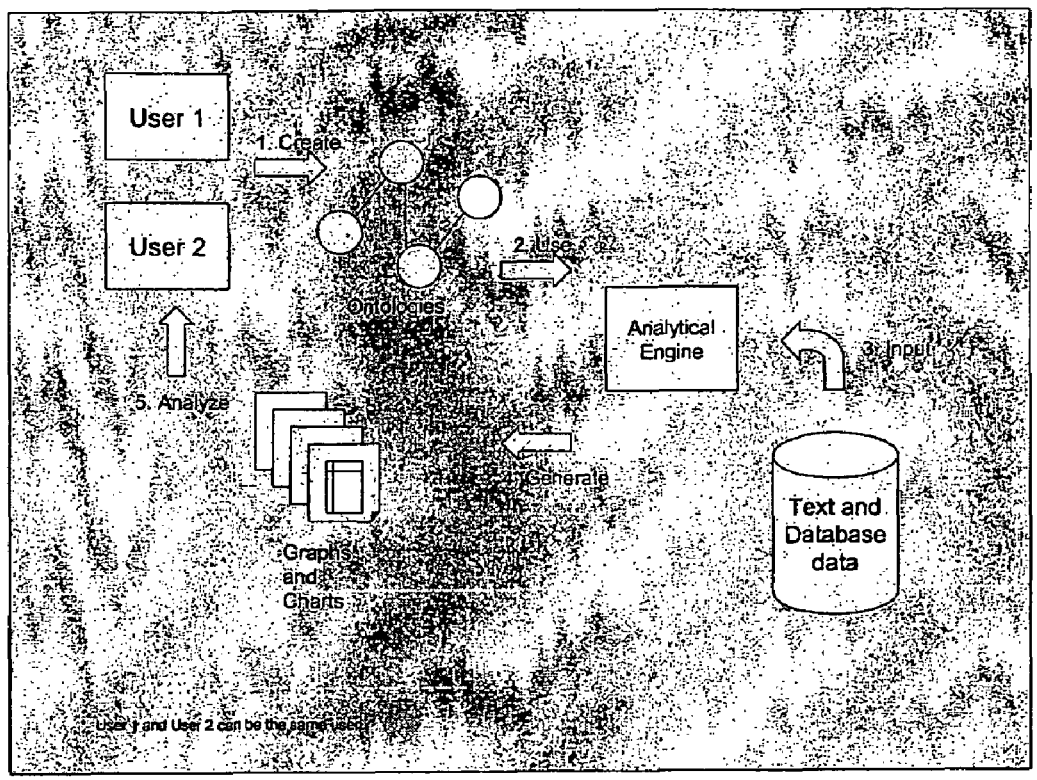
FIG. 1 is a data flow diagram that illustrates the use of ontologies to help users analyze text.

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

In order to overcome automated methodology limitations, several techniques have been proposed over the years:

Manual intervention is used in several algorithms to refine matching user expectations with that of the algorithm: This approach allows the user to direct the algorithm to identify themes, patterns and trends around their areas of interest. Several products offer such capability for the user to specify their interest and use that to analyze text data on a broader scale. The challenge here is to capture the user's interest in a formal and systematic way.

Ontologies are the product of attempts to formulate exhaustive and rigorous conceptual schemas about different domains. A domain does not have to include the complete knowledge of that topic, but is a domain of interest decided upon by the creator of the ontology. Ontologies are said to have strength or weakness based on the ability of a computer to comprehend them. A paragraph of written text can still technically be defined as an ontology, but is a weak ontology. An ontology defined in an ontology language such as OWL (web ontology language), for example, or in another suitable language, is a strong ontology, as a computer can understand the complete meaning (or semantics) of the contents (http://www.w3.org/TR/owl-guide). A strong ontology can be said to be machine-readable. In this description the focus will be on strong ontologies (henceforth referred merely as ontology or ontologies). Since the strong ontology can be part of a formal process with well-defined grammatical constructs, it can accurately capture and store a user's interest.

The popularity of ontologies appears to be growing. The ability to rigorously capture, store and reuse the conceptual schema about a domain makes ontologies attractive for diverse user communities. For example, the Semantic Web initiative is a project that intends to create a universal medium for information exchange by giving meanings (semantics), in a manner understandable by machines, to the content of documents on the Web. The Semantic Web extends the World Wide Web through the use of standards, markup languages and related processing tools. One of the main components of this initiative is capturing the representation of knowledge (which reflects a user's interest) in a formal way (http://www.w3.org/2001/sw).

Because of this initiative, several public sector organizations and private sector companies have been working on building ontologies that formally capture rich meta-data. If used appropriately, these meta-data structures can help users analyze text content. This can be done formally in the areas of user interest. A high level system flow diagram is shown in FIG. 1, which illustrates the use of ontologies for analysis of textual information. Here, a user creates one or more ontologies, which are used in an analytical engine, along with text or database input. The results can be generated in a graphical form, e.g., graphs and charts, which can then be analyzed by the same or different user.

Thesauri are widely thought of as special purpose ontologies where classes/objects are called "terms" with a limited set of relationships between these terms, as defined in the ANSI/NISO Z39.19-2003 US standard entitled "Guidelines for the Construction, Format, and Management of Monolingual Thesauri" and its equivalent international standard ISO 2788. Unlike ontologies, which allow any user-defined relationship between classes, thesauri allow only the following relationships between terms:

BT=broader term
BTG=broader term (generic)
BTI=broader term (instance)
BTP=broader term (partitive)
GS=generic structure
HN=history note
NT=narrower term
NTG=narrower term (generic)
NTI=narrower term (instance)
NTP=narrower term (partitive)
RT=related term
SEE=equivalent to U (USE)
SN=scope note
TT=top term
U=use
UF=used for
UF+=used for . . . and . . .
USE+=use . . . and . . .
X=see from (equivalent to UF); reciprocal of see Based on the fact that thesauri are specific instances of ontologies, the method described herein for mapping ontologies to concept semantic networks (CSNs) can be used to map thesauri to CSNs as well.

Figure 2:
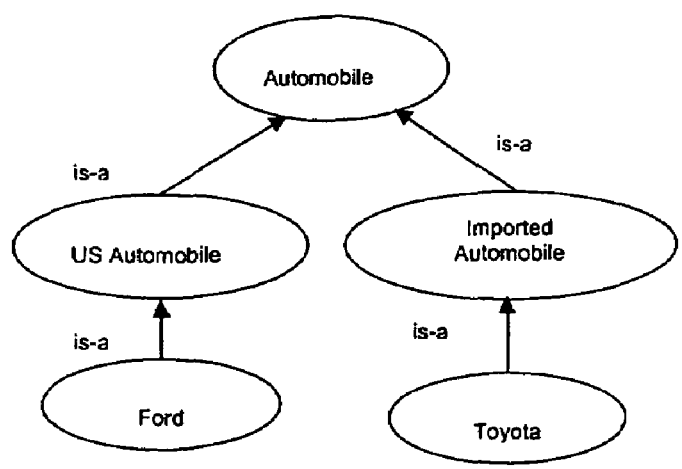
FIG. 2 illustrates an example of a concept semantic network (CSN).

A concept semantic network can be viewed as a set of ideas or concepts that are interrelated and represent one's beliefs about a certain topic. Humans develop ideas or concepts about almost every topic and these concepts can change as people learn more about these topics. A CSN becomes very useful in text analytics where users need not think about "keywords" like search engines do but rather about concepts. Once a concept is defined, the definition can be reused multiple times. FIG. 2 shows an example CSN that has definitions for "Automobile," "US Automobile," and "Imported Automobile" concepts. Notice that "Automobile" is defined in terms of the latter two concepts. Also "US Automobile" and "Imported Automobile" are in turn defined in terms of other concepts. According to the definition given in FIG. 2, when user uses "Automobile" he or she in fact means "US Automobiles" and "Imported Automobiles" which, in turn, get resolved to "Ford" and "Toyota" respectively. Of course a more complete definition might have included all US automobiles and all imported automobiles.

In other words, a concept can be defined in terms of other concepts. Another example is the concept "North America" which can be defined in terms of concepts "USA," "Canada," and "Mexico." Recursively, any of these three concepts can be defined in terms of other concepts. These multi-level definitions build what is called a concept-hierarchy.

A concept can be part of multiple concept hierarchies. For example the concept "North Atlantic Treaty Organization" can be defined in terms of concepts representing member countries which include "USA" and "Canada." Now we have "USA" and "Canada" as members of two concept hierarchies. A concept semantic network may contain one or more concept hierarchies. A valid concepts grammar is described in Appendix II.

Concepts can be as simple as a single word or a phrase, or can be a complete hierarchy, as shown in the above examples. A concept may also be a complex construct of other concepts linked using logical operators such as "AND," "OR," and "NOT." Using the above example one could define a new concept of "Toyota AND Ford NOT Honda." A complex concept can be resolved by substituting the definitions of its sub-concepts. Appendix II provides an example of a formal grammar for complex concepts. Once simple concepts are extracted from ontologies, they can be used to construct complex concepts within a CSN to provide a new level of comprehensiveness that is not possible in ontologies.

As indicated above, ontologies are developed mainly for machine consumption, which makes them less useful for human users despite their rich content. On the other hand, concept semantic networks are more user-oriented. Users are accustomed to view things as related "concepts" or "ideas." One of the challenges that face CSN users is how to create CSNs and maintain them effectively. This challenge can be overcome with variable degrees of success using one or more of the following approaches:
1. Manually define concepts.

This is a very time-consuming process and does not scale well, just like any manual process. It also requires solid understanding of the topic for which the CSN is constructed, which may not always be possible. These two factors make manual concept definitions a less favorable option among end users.

2. Automatically extract concepts from text corpora.

This is a more scalable method that is based on analyzing textual contents of text corpora, identifying important topics (thematic, exceptional, or both), and extracting those concepts. This approach is very helpful particularly in situations where user lacks deep understanding of the document contents/topics. The automated extraction can be done in two different ways:

a. Supervised: The user seeds the process with a few concepts that he/she is particularly interested in, and the process identifies and extracts only concepts related (relevant) to the seed concepts.

b. Unsupervised: The user does not provide any input to the concept extraction process. The extraction process analyzes the contents using a combination of natural language processing and statistical algorithms to identify the most prominent concepts in the corpora and also discovers the relationships that may exist among them. Just like any other unsupervised technique, this method is prone to long processing times and lower precision and recall percentages compared to its supervised counterpart.

3. Import concepts from pre-populated sources.

In this method, CSNs are built by converting other pre-populated semantic rich structures into concepts. Various organizations have spent great deal of resources to create domain specific thesauri and ontologies that are used for machine consumption purposes such as search and knowledge exchange. These thesauri and ontologies can be good sources of concepts that in turn can be leveraged to analyze textual contents. This approach is not only more efficient than the other two methods, it also avoids their shortcomings. Thesauri and ontologies are mostly created manually by domain experts so their quality and relevance is quit high. Converting thesauri and ontologies to CSN leverages this quality and makes it very easy for end users to use the work done by other experts. Though the third method is the easiest and most efficient, mapping thesauri and ontologies to CSNs is another challenging task. But once a mapping method is developed, it can be applied to any ontology.

Examples of widely accepted ontology languages include DAML (DARPA Agent Markup Language) and OWL. Ontologies include two parts; one that deals with capturing definitions of terms which cover classes, subclasses, properties, restrictions, and individual objects and a second part that addresses inference and logical implications. The first part of the language (definitions) is used primarily to establish the mapping between ontologies and CSNs.

Before explaining the conversion process, it is important to highlight some of the main differences between ontologies and CSNs, which will also clarify-some of the conversion steps.

1. CSNs allow concepts to have "Concept Types" as a semantic property. For example the concept "Automobile" can be of the concept type "Vehicle." Ontologies allow any number of properties and property values. During the mapping process, several options for identifying concept types from ontologies can be used, some of which are presented below.

2. Ontologies make distinctions between classes, subclasses, and objects, whereas in CSNs, entities are primarily concepts. For example, in an ontology, "Automobile" can be a class with a subclass of "US automobile," and an object of that subclass can be "Ford." In a CSN, "automobile," "US automobile," and "Ford" are three different concepts. The hierarchical relationship between the three entities can be preserved in a CSN, as illustrated below.

Figure 3:
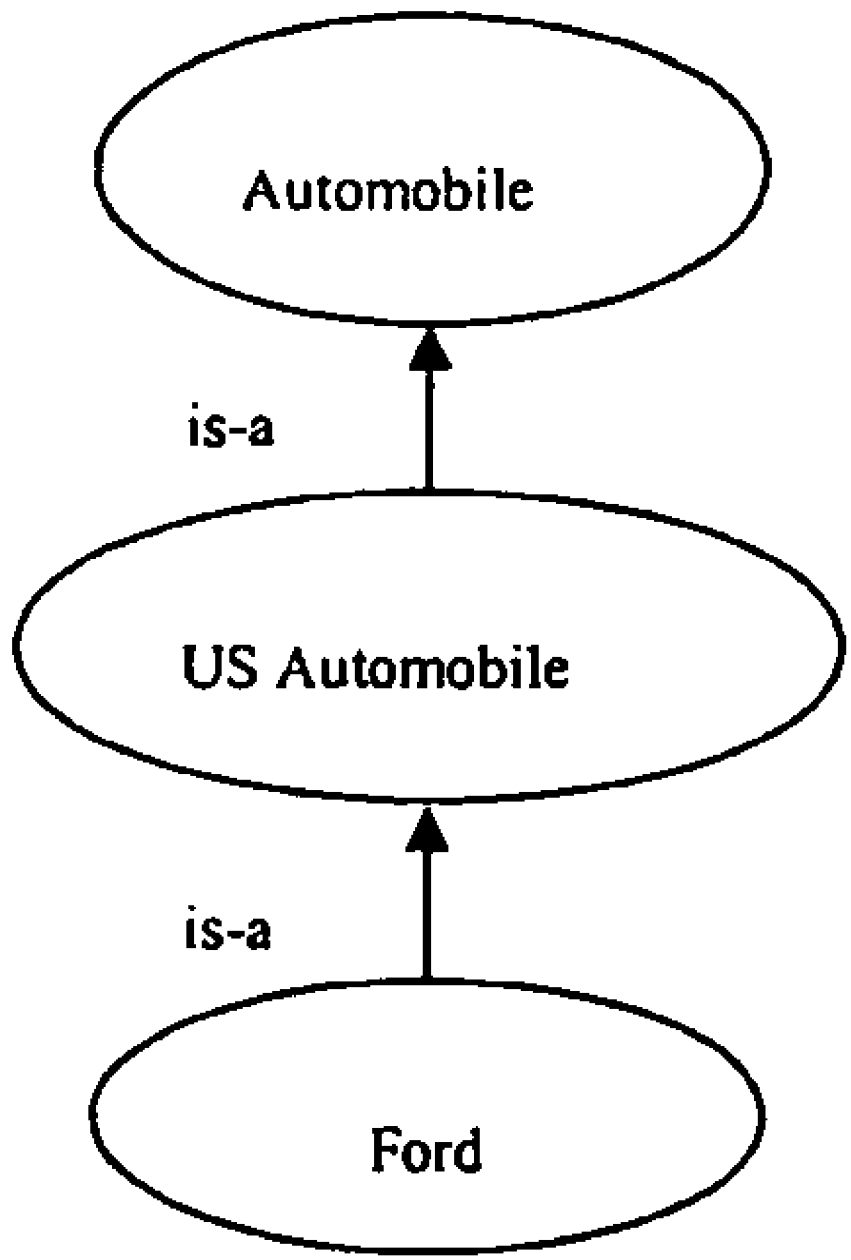
FIG. 3 illustrates another example of a CSN.

3. An ontology allows almost any type of relationships to exist between entities where in the CSN, the "is-a" relationship is primarily allowed. In other words, using the example above, "Ford" is-a "US automobile." It also is-an "automobile," and similarly "US automobile" is-an "automobile," as shown in FIG. 3.

Figure 4:
FIG. 4 illustrates an example of an ontology.

To illustrate the conversion process, an ontology about digital camera components will be used. This example is presented for illustration purposes only and does not limit the scope of the invention. The actual code for the digital camera ontology is presented in Appendix I. The ontology classes are: "PurchaseableItem," "Money," "Range," "Viewer," and "Window" as shown in the FIG. 4.

Figure 5:
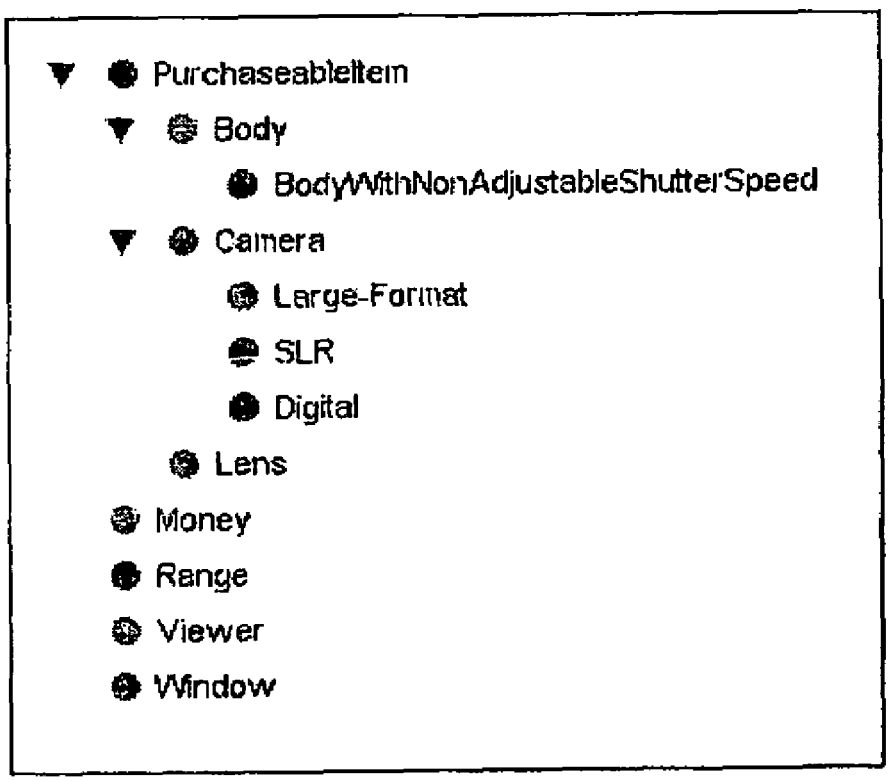
FIG. 5 illustrates the ontology of FIG. 4, with an expanded list of subclasses.

The PurchaseableItem class has the subclasses "Body," "Camera," and "Lens." Also "Body" and "Camera" have a number of subclasses. The expanded list of classes and subclasses is shown in FIG. 5.

Figure 6:
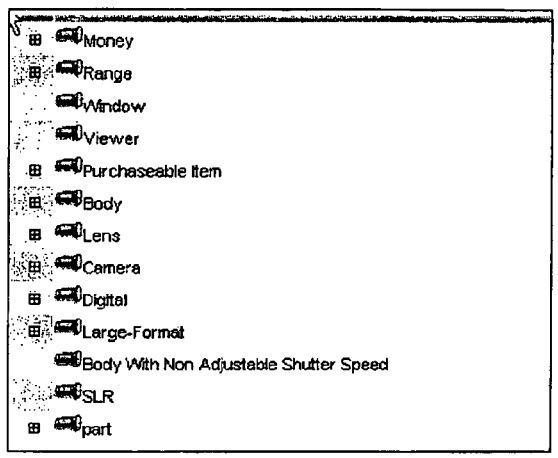
FIG. 6 illustrates a CSN resulting from the ontology of FIG. 5.

All ontology classes and subclasses are mapped into concepts in a CSN while preserving their hierarchical relationships. This means that the resulting CSN has the following concepts: "Purchaseable Item," "Body," "Body With Non Adjustable Shutter Speed," "Camera," "Large Format," "SLR," "Digital," "Lens," "Money," "Range," "Viewer," and "Window." These concepts are shown in the list view of FIG. 6.

Note that a "part" concept is also shown, though it was not one of the ontology classes or subclasses, but this will be explained later. Notice also that in an ontology, class and subclass names are made of a connected string (with no white spaces) as required by the ontology language specifications. In a CSN, there is no such restriction and therefore, during the conversion process, connected multiword strings are split into multiple words to provide a more user friendly interface. Bear in mind that ontologies are more machine oriented while CSNs are for human user consumption and so they are expected to be user friendly.

After identifying the concepts, the ontology-CSN conversion method identifies the concept type to associate with every concept. Several options are available to accomplish this task. The conversion mechanism may interact with the user to capture his/her preference as to which option to choose. Options can include:

Ontology Name: The top-level (root) element of the ontology can be used as a concept type for all concepts extracted from that ontology. This means that, for the digital camera example, every concept will be of the type "Digital Camera."

Parent Concept: Parent concepts can be used as concept types. For the top most parent concept, the concept name is used as its concept type. In the above example "Purchasable Item" will be the type for concepts "Purchasable Item," "Body," "Camera," and "Lens." "Camera" will be the type for concepts "Large Format," "SLR," and "Digital."

Top Most Class: The topmost root node for the hierarchy can be used as the concept type for all child concepts of that subtree. In the example above "Purchasable Item" will be the concept type for all concepts under its subtree.

Auto Concept Type: Concept types can be generated automatically using WordNet or another semantic network to identify relevant concept types.

Figure 7:
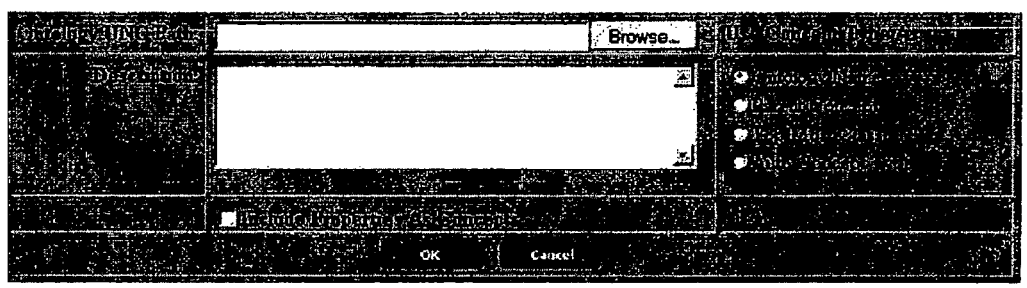
FIG. 7 illustrates an example of a graphical user interface (GUI) used to capture a user's preferences in assigning concept types.

FIG. 7 shows a sample graphical user interface that can capture a user's preference in assigning concept types.

In addition to representing class hierarchies, ontologies are capable of representing property hierarchies. One can define a property with a number of sub-properties recursively, which establishes a hierarchy. Using a ontology-CSN conversion utility, property hierarchies are converted into concept hierarchies. In the digital camera example, "part" is a property that has two subproperties; namely, "lens" and "body." This hierarchy is also converted to a concept hierarchy with a parent concept of "part" and two child concepts of "lens" and "body."

Figure 8:
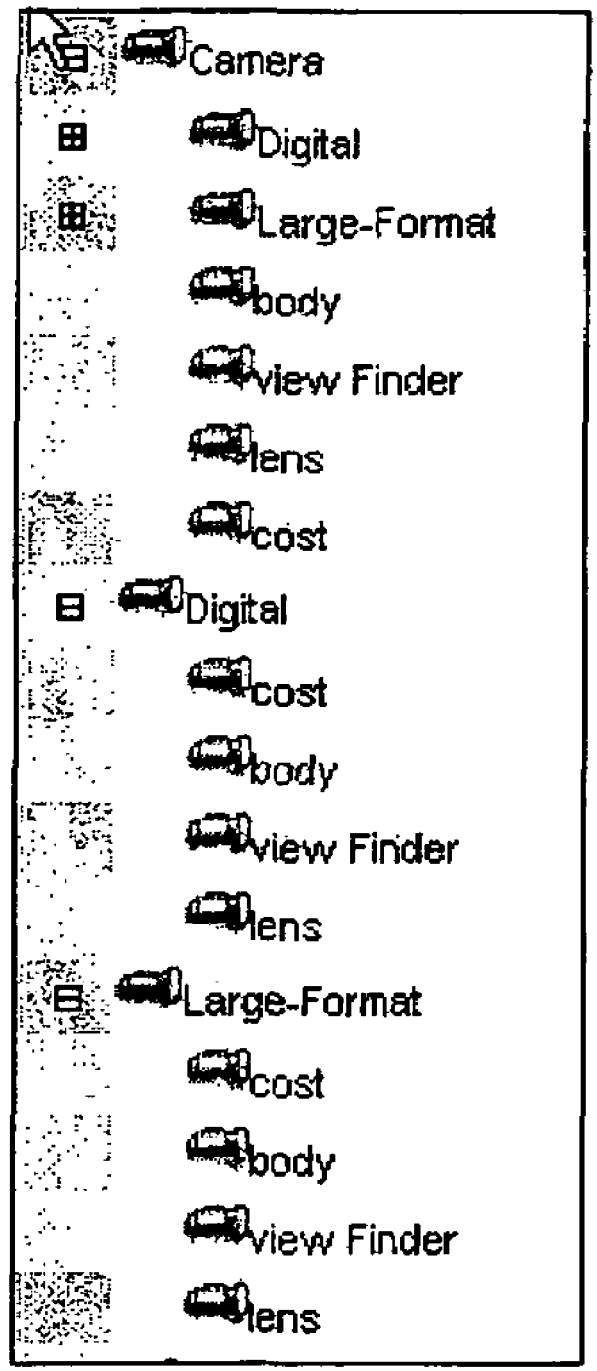
FIG. 8 illustrates a CSN that reflects the inheritance of properties that occur in a related ontology.

One of the major differences between an ontology and a CSN is inheritance. Ontologies allow downward inheritance of class properties to all its subclasses. In a CSN, concept properties may have to be explicitly defined. In other words, though concepts may be related with "is-a" relationships in a CSN, this does not necessarily imply inheriting ancestor's properties. The ontology-CSN conversion utility allows users the option to convert class properties as "child" concepts of the concept that maps to that class. If a user uses this option, properties will also be considered as child concepts of the other child concepts that map to the subclasses of the main class. To illustrate this, consider the digital camera example. The "Camera" class has "Digital" and "Large-Format" as two subclasses and "body," "view Finder," "lens," and "cost" as properties. The conversion is done such that "Camera" is the parent concept and "Digital" and "Large-Format" are two of its child concepts. A user can also choose to include properties as child concepts in which case "body," "view Finder," "lens," and "cost" also become child concepts of "Camera," as illustrated in FIG. 8. Since "Digital" and "Large-Format" are subclasses of "Camera," they inherit its properties. Regarding the CSN shown in FIG. 8, "body," "view Finder," "lens," and "cost" are also child concepts of "Digital" and "Large-Format." In other words, a user can preserve the inheritance of properties feature of ontologies when CSNs are created.

The following example, shown in Table 1, explains a part of an aviation thesaurus that deals with "air conditioning systems." "Air cycle machines", "ducts", "equipment cooling fans", heat exchangers", "mixing valves", "packs", and "recirculation fans" are narrower terms with respect to "air conditioning systems". Not only is there a great deal of redundancy in describing the relationships between terms, but users cannot use other types of criteria to group terms. When this is converted into a concept bank, as shown in Table 2, the representation is more compressed and allows the user to provide "concept types" for every concept. The types can be used for grouping and browsing purposes. In this example the user chooses to assign, whether manually or automatically (using a lexical database), the concept type "Parts" to the terms "fans" and "ducts". The user can always browse concepts using "Part" which was not possible using thesauri.

TABLE 1

| TERMID | TERM | REL | TERMID | TERM |
|---|---|---|---|---|
| 10161 | air conditioning system | NT | 11230 | air cycle machines |
| 10161 | air conditioning system | NT | 10165 | ducts |
| 10161 | air conditioning system | NT | 10226 | equipment cooling fans |
| 10161 | air conditioning system | NT | 10500 | heat exchangers |
| 10161 | air conditioning system | NT | 10172 | mixing valves |
| 10161 | air conditioning system | NT | 1295 | packs |
| 10161 | air conditioning system | NT | 1302 | recirculation fans |
| 11230 | air cycle machines | BT | 10161 | air conditioning system |
| 10165 | ducts | BT | 10161 | air conditioning system |
| 10226 | equipment cooling fans | BT | 10161 | air conditioning system |
| 10500 | heat exchangers | BT | 10161 | air conditioning system |
| 10172 | mixing valves | BT | 10161 | air conditioning system |
| 1295 | packs | BT | 10161 | air conditioning system |
| 1302 | recirculation fans | BT | 10161 | air conditioning system |
| 11230 | air cycle machines | UF | 11231 | ACM |
| 11231 | ACM | Use | 11230 | air cycle machines |
| 10226 | equipment cooling fans | UF | 11208 | equipment fans |
| 11208 | equipment fans | Use | 10226 | equipment cooling fans |
| 10172 | mixing valves | UF | 10921 | mix valves |
| 10921 | mix valves | Use | 10172 | mixing valves |
| 1302 | recirculation fans | RT | 11207 | fans |
| 11207 | fans | RT | 1302 | recirculation fans |

TABLE 2

| CONCEPT_TYPE | PARENT_CONCEPT | CONCEPT_TYPE | CHILD_CONCEPT |
|---|---|---|---|
| Mechanical Systems | air conditioning system | Mechanical Systems | air cycle machines |
| Mechanical Systems | air conditioning system | Parts | ducts |
| Mechanical Systems | air conditioning system | Parts | equipment cooling fans |
| Mechanical Systems | air conditioning system | Mechanical Systems | heat exchangers |
| Mechanical Systems | air conditioning system | Parts | mixing valves |
| Mechanical Systems | air conditioning system | Parts | packs |
| Mechanical Systems | air conditioning system | Parts | recirculation fans |
| Mechanical Systems | air cycle machines | Mechanical Systems | ACM |
| Parts | equipment cooling fans | Parts | equipment fans |

TABLE 2-continued

| CONCEPT_TYPE | PARENT_CONCEPT | CONCEPT_TYPE | CHILD_CONCEPT |
|---|---|---|---|
| Parts | mixing valves | Parts | mix valves |
| Parts | recirculation fans | Parts | fans |

Figure 9:
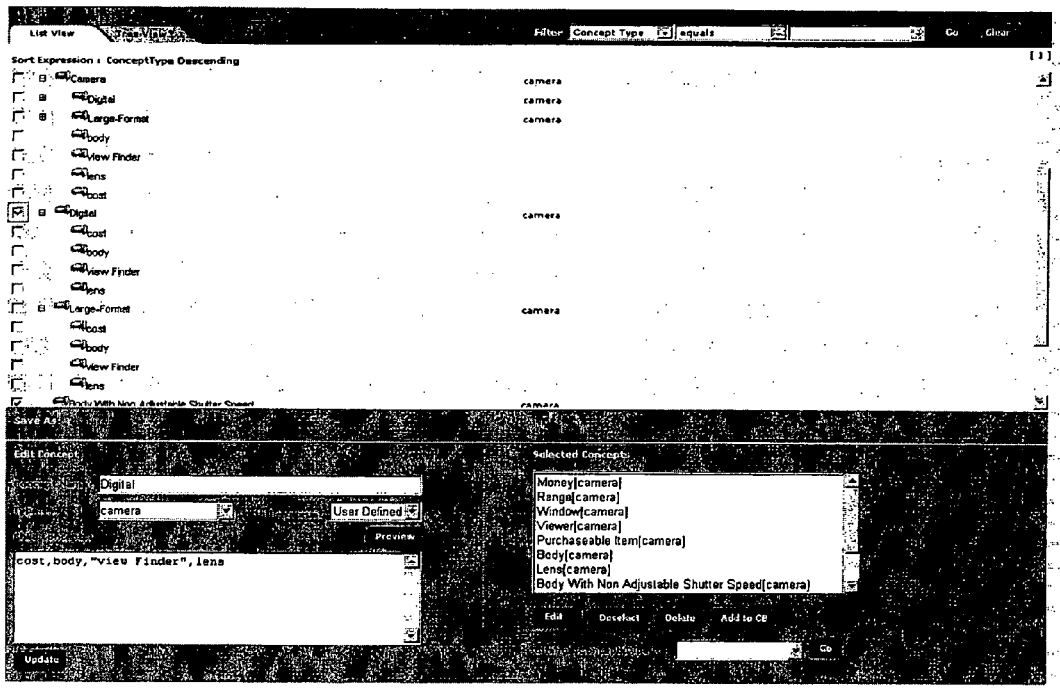
FIG. 9 illustrates an example of a graphical user interface that allows a user to customize concept definitions and relationships in a CSN.

Due to the differences between the two representation schemes of ontologies and CSNs, automated conversion may not perfectly satisfy every end-user need. Therefore, it can be useful to have an easy to use user interface that allows users to edit the generated CSN before it is saved. Users may also want to take advantage of having their concepts in a CSN and start building more complex concepts of the basic concepts extracted from the ontology. The conversion utility could provide a GUI similar to the one presented in FIG. 9 to enable users to customize concept definitions and relationships. Internally CSNs can be stored in relational tables with an option to save or export them into other formats, such as XML, CSV, and Excel.

Figure 10:
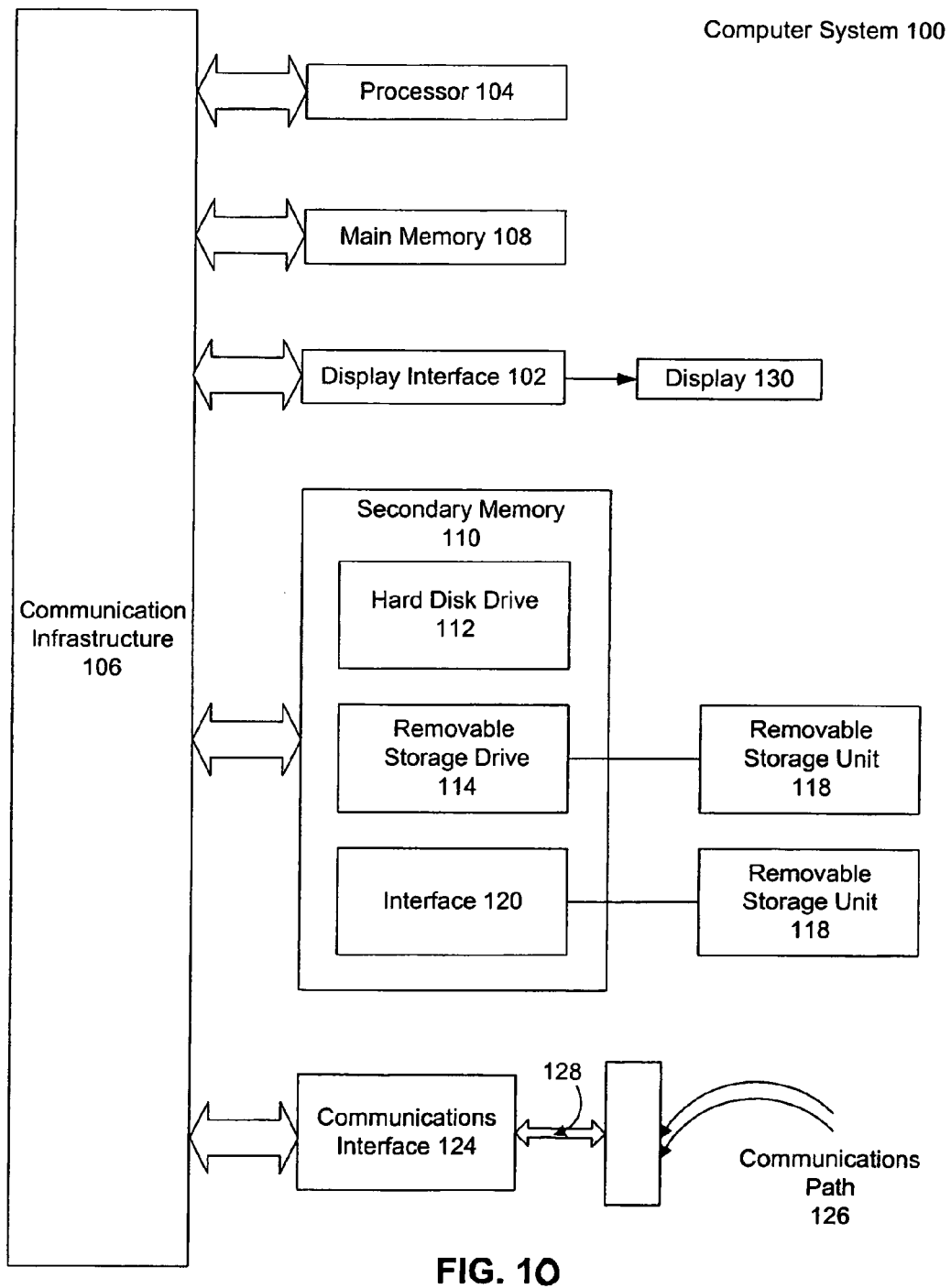
FIG. 10 illustrates a computing platform on which the invention can be implemented.

In an embodiment of the present invention, the system and components of the present invention described herein are implemented using well known computers, such as a computer 100 shown in FIG. 10. The computer 100 can be a special purpose device, or any commercially available and well known computer capable of performing the functions described herein, such as computers available from International Business Machines, Apple, Silicon Graphics Inc., Sun, HP, Dell, Compaq, Digital, Cray, etc.

The computer 100 includes one or more processors (also called central processing units, or CPUs), such as a processor 104. The processor 104 is connected to a communication bus 106. The computer 100 also includes a main or primary memory 108, such as random access memory (RAM). The primary memory 108 has stored therein control logic (computer software), and data.

The computer 100 also includes one or more secondary storage devices 110. The secondary storage devices 110 include, for example, a hard disk drive 112 and/or a removable storage device or drive 114. The removable storage drive 114 represents a floppy disk drive, a magnetic tape drive, a compact disk drive, an optical storage device, tape backup, etc.

The removable storage drive 114 interacts with a removable storage unit 118. The removable storage unit 118 includes a computer useable or readable storage medium having stored therein computer software (control logic) and/or data. Removable storage unit 118 represents a floppy disk, magnetic tape, compact disk, DVD, optical storage disk, or any other computer data storage device. The removable storage drive 114 reads from and/or writes to the removable storage unit 118 in a well known manner.

The computer 100 also includes input/output/display devices, such as display 130, keyboards, pointing devices, etc.

The computer 102 further includes a communication or network interface 124. The interface 124 enables the computer 100 to communicate with remote devices. For example, the interface 124 allows the computer 100 to communicate over communication networks or media (representing a form of a computer useable or readable medium), such as LANs, WANs, the Internet, etc. The interface 124 may interface with remote sites or networks via wired or wireless connections.

Control logic may be transmitted to and from the computer 100 via the communication medium 126. More particularly, the computer 100 may receive and transmit carrier waves (electromagnetic signals) 128 modulated with control logic via the communication medium 126.

Any apparatus or manufacture comprising a computer useable or readable medium having control logic (software) stored therein is referred to herein as a computer program product or program storage device. This includes, but is not limited to, the computer 100, the main memory 108, the hard disk 112, the removable storage unit 118 and the carrier waves modulated with control logic. Such computer program products, having control logic stored therein that, when executed by one or more data processing devices, cause such data processing devices to convert an ontology into a CSN as described herein, represent embodiments of the invention.

The invention can work with software, hardware, and/or operating system implementations other than those described herein. Any software, hardware, and operating system implementations suitable for performing the functions described herein can be used.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

APPENDIX I

Digital Camera OWL Ontology

<?xml version="1.0" encoding="UTF-8"?>
<rdf:RDF xmlns:rdf="http://www.w3.org/1999/02/22-rdf-syntax-ns#"
    xmlns:rdfs="http://www.w3.org/2000/01/rdf-schema#"
    xmlns:owl="http://www.w3.org/2002/07/owl#"
    xmlns="http://www.xfront.com/owl/ontologies/camera/#"
    xmlns:camera="http://www.xfront.com/owl/ontologies/camera/#"
    xml:base="http://www.xfront.com/owl/ontologies/camera/">
  <owl:Ontology rdf:about="">
    <rdfs:comment> Camera OWL Ontology</rdfs:comment>

APPENDIX I-continued

Digital Camera OWL Ontology

```xml
</owl:Ontology>
    <owl:Class rdf:ID="Money">
        <rdfs:subClassOf rdf:resource="http://www.w3.org/2002/07/owl#Thing"/>
    </owl:Class>
    <owl:DatatypeProperty rdf:ID="currency">
        <rdfs:domain rdf:resource="#Money"/>
        <rdfs:range rdf:resource="http://www.w3.org/2001/XMLSchema#string"/>
    </owl:DatatypeProperty>
    <owl:Class rdf:ID="Range">
        <rdfs:subClassOf rdf:resource="http://www.w3.org/2002/07/owl#Thing"/>
    </owl:Class>
    <owl:DatatypeProperty rdf:ID="min">
        <rdfs:domain rdf:resource="#Range"/>
        <rdfs:range rdf:resource="http://www.w3.org/2001/XMLSchema#float"/>
    </owl:DatatypeProperty>
    <owl:DatatypeProperty rdf:ID="max">
        <rdfs:domain rdf:resource="#Range"/>
        <rdfs:range rdf:resource="http://www.w3.org/2001/XMLSchema#float"/>
    </owl:DatatypeProperty>
    <owl:DatatypeProperty rdf:ID="units">
        <rdfs:domain rdf:resource="#Range"/>
        <rdfs:range rdf:resource="http://www.w3.org/2001/XMLSchema#string"/>
    </owl:DatatypeProperty>
    <owl:Class rdf:ID="Window">
        <rdfs:subClassOf rdf:resource="http://www.w3.org/2002/07/owl#Thing"/>
    </owl:Class>
    <camera:Window rdf:ID="ThroughTheLens"/>
    <camera:Window rdf:ID="WindowOnTopOfCamera"/>
    <owl:Class rdf:ID="Viewer">
       <owl:oneOf rdf:parseType="Collection">
            <camera:Window rdf:about="#ThroughTheLens"/>
            <camera:Window rdf:about="#WindowOnTopOfCamera"/>
        </owl:oneOf>
    </owl:Class>
    <owl:Class rdf:ID="PurchaseableItem">
        <rdfs:subClassOf rdf:resource="http://www.w3.org/2002/07/owl#Thing"/>
    </owl:Class>
    <owl:ObjectProperty rdf:ID="cost">
        <rdfs:domain rdf:resource="#PurchaseableItem"/>
        <rdfs:range rdf:resource="#Money"/>
    </owl:ObjectProperty>
    <owl:Class rdf:ID="Body">
        <rdfs:subClassOf rdf:resource="#PurchaseableItem"/>
    </owl:Class>
    <owl:Class rdf:ID="BodyWithNonAdjustableShutterSpeed">
        <owl:intersectionOf rdf:parseType="Collection">
            <owl:Class rdf:about="#Body"/>
            <owl:Restriction>
                <owl:onProperty rdf:resource="#shutter-speed"/>
                <owl:cardinality>0</owl:cardinality>
            </owl:Restriction>
        </owl:intersectionOf>
    </owl:Class>
    <owl:Class rdf:ID="Lens">
        <rdfs:subClassOf rdf:resource="#PurchaseableItem"/>
    </owl:Class>
    <owl:Class rdf:ID="Camera">
        <rdfs:subClassOf rdf:resource="#PurchaseableItem"/>
    </owl:Class>
    <owl:Class rdf:ID="SLR">
        <owl:intersectionOf rdf:parseType="Collection">
            <owl:Class rdf:about="#Camera"/>
            <owl:Restriction>
                <owl:onProperty rdf:resource="#viewFinder"/>
                <owl:hasValue rdf:resource="#ThroughTheLens"/>
            </owl:Restriction>
        </owl:intersectionOf>
    </owl:Class>
    <owl:Class rdf:ID="Large-Format">
        <rdfs:subClassOf rdf:resource="#Camera"/>
        <rdfs:subClassOf>
            <owl:Restriction>
                <owl:onProperty rdf:resource="#body"/>
                <owl:allValuesFrom rdf:resource="#BodyWithNonAdjustableShutterSpeed"/>
            </owl:Restriction>
        </rdfs:subClassOf>
```

APPENDIX I-continued

Digital Camera OWL Ontology

```
    </owl:Class>
    <owl:Class rdf:ID="Digital">
        <rdfs:subClassOf rdf:resource="#Camera"/>
    </owl:Class>
    <owl:ObjectProperty rdf:ID="part"/>
    <owl:ObjectProperty rdf:ID="lens">
        <rdfs:subPropertyOf rdf:resource="#part"/>
        <rdfs:domain rdf:resource="#Camera"/>
        <rdfs:range rdf:resource="#Lens"/>
    </owl:ObjectProperty>
    <owl:ObjectProperty rdf:ID="body">
        <rdfs:subPropertyOf rdf:resource="#part"/>
        <rdfs:domain rdf:resource="#Camera"/>
        <rdfs:range rdf:resource="#Body"/>
    </owl:ObjectProperty>
    <owl:ObjectProperty rdf:ID= "viewFinder">
        <rdf:type
rdf:resource="http://www.w3.org/2002/07/owl#FunctionalProperty"/>
        <rdfs:domain rdf:resource="#Camera"/>
        <rdfs:range rdf:resource="#Viewer"/>
    </owl:ObjectProperty>
    <owl:DatatypeProperty rdf:ID="size">
        <rdfs:domain rdf:resource="#Lens"/>
        <rdfs:range rdf:resource="http://www.w3.org/2001/XMLSchema#string"/>
    </owl:DatatypeProperty>
    <owl:DatatypeProperty rdf:ID="aperture">
        <rdfs:domain rdf:resource="#Lens"/>
        <rdfs:range rdf:resource="http://www.w3.org/2001/XMLSchema#string"/>
    <owl:DatatypeProperty>
    <owl:ObjectProperty rdf:ID="compatibleWith">
        <rdfs:domain rdf:resource="#Lens"/>
        <rdfs:range rdf:resource="#Body"/>
    </owl:ObjectProperty>
    <owl:ObjectProperty rdf:ID="shutter-speed">
        <rdfs:domain rdf:resource="#Body"/>
        <rdfs:range rdf:resource="#Range"/>
    </owl:ObjectProperty>
    <owl:DatatypeProperty rdf:ID="focal-length">
        <owl:equivalentProperty rdf:resource="#size"/>
        <rdfs:domain rdf:resource="#Lens"/>
        <rdfs:range rdf:resource="http://www.w3.org/2001/XMLSchema#string"/>
    </owl:DatatypeProperty>
    <owl:DatatypeProperty rdf:ID="f-stop">
        <owl:equivalentProperty rdf:resource="#aperture"/>
        <rdfs:domain rdf:resource="#Lens"/>
        <rdfs:range rdf:resource="http://www.w3.org/2001/XMLSchema#string"/>
    </owl:DatatypeProperty>
</rdf:RDF>
```

APPENDIX II

Concept Grammar

Legal Characters
Child Concepts
  ABCDEFGHIJKLMNOPQRSTUVWXYZ1234567890()/~\"(space)
Parent Concepts
  ABCDEFGHIJKLMNOPQRSTUVWXYZ1234567890
  (space)
Concept Types
  ABCDEFGHIJKLMNOPQRSTUVWXYZ1234567890
  (space)
Child Concepts text box (form concept pane in GUI)
  ABCDEFGHIJKLMNOPQRSTUVWXYZ1234567890()/~\"☐,(space)

Maximum Lengths
Concept=900 characters
Concept Types=100 characters

Complex Concept Connector Patterns
  The following are invalid patterns:
  (NOTE: regular expressions follow summary.)
  The connectors can not appear next to each other (ex. and and) (ex. and or)

```
(\sand|\sor|\s(((w/|pre/)|pre/)[1-9][0-9]*(~~[1-9][0-
9]*)?))\s+(and\s|or\s|(((w/|pre/)|pre/)[1-9][0-9]*(~~[1-9][0-9]*)?))\s*
\s+(and\s|or\s|(((w/|pre/)|pre/)[1-9][0-9]*(~~[1-9][0-
9]*)?))\s*(and|or|(((w/|pre/)|pre/)[1-9][0-9]*(~~[1-9][0-9]*)?))
```

"not" can not be directly followed by "and," "or," or "not"
  \snot\s+(and|or|not)\s+

"of" may not be followed by connector
  \sof\s+(of|and|or|((w/|pre/)[1-9][0-9]*(~~[1-9]*)?))\s+

Within or Pre searches may not be followed by "of"
  ((w/|pre/)[1-9][0-9]*(~~[1-9][0-9]*)?)\sof\s+

All complex concepts should be contained in the following patterns:

Find all phrases with or without "~" that contain "and" or "or"—alphanumeric words and tilde are optional i.e. Words and/or tilda connected by "and" or "or"

[a-z0-9][a-z0-9]*[~]?\s+(and|or)\s+[a-z0-9][a-z0-9]*[~]?

Valid connection using "w/" or "pre/"

NOTE: "of" is an optional word that is ignored when used with "w/" or "pre/"

```
\snot\s*(\s((w/|pre/)|pre/)[1-9][0-9]*(~~[1-9][0-9]*)?)?\
s+[a-z0-9][a-z0-9]*[~]?
\s*[a-z0-9][a-z0-9    ]*[~]?\s+((w/|pre/)|pre/)[1-9][0-9]
*(\sof)?(\s+[1-
9][0-9]*~~\s*[1-9][0-9]*\s*|\s+[a-z0-9][a-z0-9 ]
*[~]?)\s*
\s*([a-z0-9][a-z0-9 ]*[~]?\s|[a-z0-9][a-z0-9 ]*[~]?\
s((w/|pre/)|pre/)[1-
9][0-9]*)?\s*[1-9][0-9]*~~\s*[1-9][0-9]*(\s[a-z0-9][a-z0-9 ]
*[~]?|\s[a-z0-9][a-z0-
9 ]*[~]?\s((w/|pre/)|pre/)[1-9][0-9]*)?
```

Find patterns with "~~" between two numbers

\s+[1-9][0-9]*\s*~~\s*[1-9][0-9]*\s

Only alpha-numeric characters with or without a tilde are allowed in non-complex concepts.

[a-z0-9][a-z0-9]*[~]

What is claimed is:

1. A computer-readable storage medium comprising code representing instructions to cause a computer to produce a concept semantic network (CSN) from an ontology by:
    for each class in the ontology, converting that class into a concept in the CSN, that concept corresponding to that class in the ontology;
    converting each property of each class into a child concept of the concept corresponding to that class in the CSN;
    converting each subclass, each object, and each restriction of the ontology to distinct concepts in the CSN; and
    converting each hierarchy in the ontology to a concept hierarchy in the CSN, the hierarchies in the ontology comprising a property hierarchy.

2. The computer-readable storage medium of claim 1, further comprising code representing instructions to cause a computer to:
    identify a type for each concept in the CSN.

3. The computer-readable storage medium of claim 1, further comprising code representing instructions to cause a computer to:
    preserve, in the CSN, inherited properties in the ontology.

4. The computer-readable storage medium of claim 1, further comprising code representing instructions to cause a computer to:
    receive editing commands from a user; and
    manipulate the CSN according to the received editing commands.

* * * * *